United States Patent
Kuo et al.

(10) Patent No.: US 9,400,041 B2
(45) Date of Patent: Jul. 26, 2016

(54) BALL SCREW ASSEMBLY HAVING A TUNNEL RACEWAY

(71) Applicant: HIWIN TECHNOLOGIES CORP., Taichung (TW)

(72) Inventors: Chang-Hsin Kuo, Taichung (TW); Sheng-Chih Chang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 136 days.

(21) Appl. No.: 14/503,885

(22) Filed: Oct. 1, 2014

(65) Prior Publication Data

US 2015/0362050 A1  Dec. 17, 2015

(30) Foreign Application Priority Data

Jun. 16, 2014  (TW) .............................. 103120762 A

(51) Int. Cl.
*F16H 25/22* (2006.01)

(52) U.S. Cl.
CPC ........ *F16H 25/2228* (2013.01); *F16H 25/2214* (2013.01); *Y10T 74/19763* (2015.01)

(58) Field of Classification Search
CPC . F16H 25/22; F16H 25/2204; F16H 25/2214; F16H 25/2219; F16H 25/2223; F16H 25/2228; F16H 25/2233; F16H 2025/2481; Y10T 74/19763; Y10T 74/19744; Y10T 74/19749; Y10T 74/19753; Y10T 74/19758; Y10T 74/19767; Y10T 74/19772; Y10T 74/19777
USPC ........ 74/89.23, 89.24, 89.36, 424.81, 424.82, 74/424.83, 424.84, 424.85, 424.86, 74/424.87, 424.88
See application file for complete search history.

(56) References Cited

U.S. PATENT DOCUMENTS

| 2,590,745 | A * | 3/1952 | Wuensch | ................ F16K 31/05 74/625 |
| 2003/0051569 | A1 * | 3/2003 | Kapaan | .................... F16D 65/18 74/424.85 |
| 2004/0093973 | A1 * | 5/2004 | Halasy-Wimmer | ....... B21F 3/02 74/424.85 |

FOREIGN PATENT DOCUMENTS

| EP | 0092331 A1 * | 10/1983 | .......... F16H 25/2204 |
| EP | 1584542 A1 * | 10/2005 | .......... F16H 25/2223 |

(Continued)

OTHER PUBLICATIONS

FR 2198589 A5, Mar. 1974, Machine translation via Espacenet, printed Apr. 7, 2016, pp. 1-4.*

(Continued)

*Primary Examiner* — William Kelleher
*Assistant Examiner* — Leonard J Archuleta
(74) *Attorney, Agent, or Firm* — Muncy, Geissler, Olds & Lowe, P.C.

(57) ABSTRACT

A tunnel raceway type ball screw assembly includes a screw nut having an inner thread groove, a screw shaft inserted through the screw nut and including outer grooves, a mounting groove extending across the outer grooves and a first reflow groove in radial communication with the mounting groove, and a reflow component mounted in the mounting groove of the screw shaft and including a rolling groove connected with the outer grooves to form an outer thread that defines with the inner thread groove a spiral channel therebetween and a second reflow groove that defines with the first reflow groove a reflow channel therebetween in communication with the spiral channel. Thus, multiple balls can be cycled in the spiral channel and the reflow channel.

6 Claims, 5 Drawing Sheets

(56) References Cited

FOREIGN PATENT DOCUMENTS

| | | | | |
|---|---|---|---|---|
| EP | 2128493 | A1 * | 12/2009 | .......... F16H 25/2223 |
| FR | 2198589 | A5 * | 3/1974 | ............... B23Q 5/40 |
| JP | 2005-201347 | A | 7/2005 | |
| JP | WO 2007113986 | A1 * | 10/2007 | .......... F16H 25/2228 |
| JP | 2010-090953 | A | 4/2010 | |
| TW | M472136 | | 2/2014 | |

OTHER PUBLICATIONS

Yamamoto Kentaro, WO 2007113986 A1, Oct. 2007, Machine translation via WIPO, printed Apr. 7, 2016, pp. 1-3.*

* cited by examiner

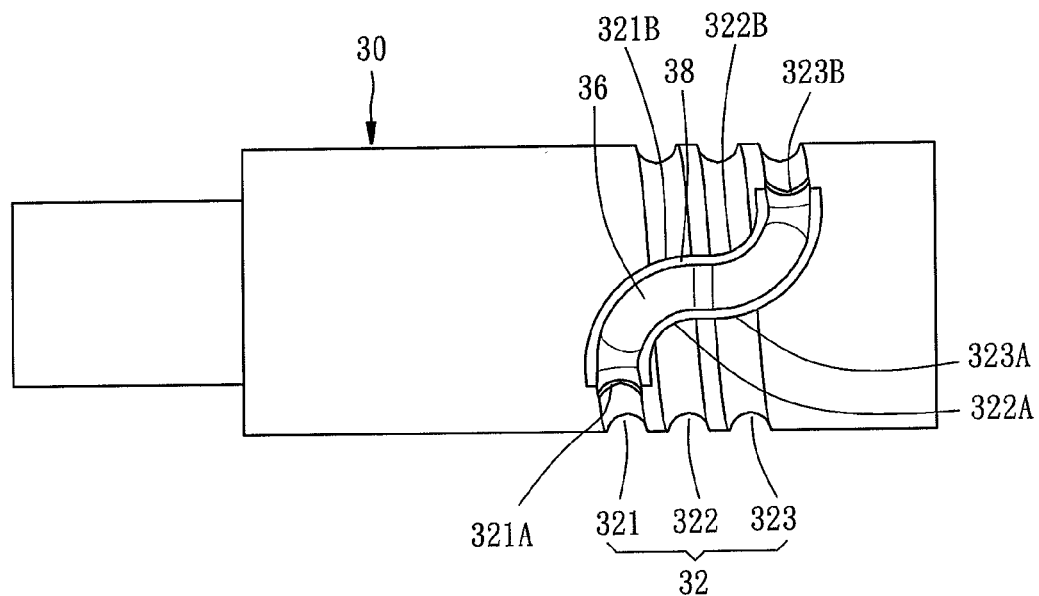
FIG. 3
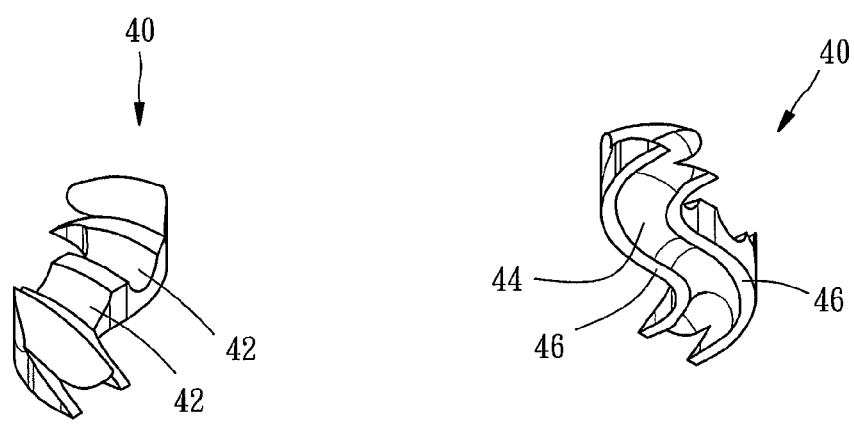
FIG. 4
FIG. 5

BALL SCREW ASSEMBLY HAVING A TUNNEL RACEWAY

BACKGROUND OF THE INVENTION

1. Field of the Invention

The invention relates to ball screw technology, and more particularly, to a tunnel raceway type ball screw assembly, which greatly enhances durability and cycling stability.

2. Description of the Related Art

Many ball screw designs are known. Japanese Patent 2010-090953 discloses the establishment of a cycling channel on the surface of a screw shaft for enabling balls to cycle along an outer thread groove of the screw shaft. However, this cycling channel simply extends over one single thread lead. For an application that the lead is kept in proximity to the ball diameter, ball impact can be a concern if the tooth thickness between one groove to another is excessively thin. Further, Taiwan Patent M472136 adopts a similar cycling channel design that extends across one single lead. However, this design has the same problem as the aforesaid prior art Japanese patent. Further, if a design to shift a pitch is adopted, it will encounter a spatial arrangement problem. Further, Japanese Patent 2005-201347 discloses a stepped design to guide the balls, however, this design has the drawbacks of processing difficulties and poor cycling stability.

SUMMARY OF THE INVENTION

The present invention has been accomplished under the circumstances in view. It is therefore the main object of the present invention to provide a tunnel raceway type ball screw assembly, which greatly enhances structural durability, reliability and cycling stability.

To achieve this and other objects of the present invention, a tunnel raceway type ball screw assembly of the invention comprises of a screw nut defining therein an inner thread groove, a screw shaft rotatably inserted through the screw nut, reflow component, and a plurality of balls. The screw shaft comprises of on an outer surface thereof a plurality of outer grooves corresponding to the inner thread groove, a first reflow groove and a mounting groove. The outer grooves are arranged along the length of the screw shaft, and identified as a front outer groove at the front side, a rear outer groove at an opposing rear side, and at least one intermediate outer groove between the front outer groove and the rear outer groove. The first reflow groove has two ends respectively connected to the first end of the front outer groove and the second end of the rear outer groove. The mounting groove substantially extends along the first reflow groove, and is kept in communication with the second end of the front outer groove, the first end of the rear outer groove, and the two opposite ends of each intermediate outer groove. The reflow component is mounted in the mounting groove of the screw shaft, comprising a plurality of rolling grooves facing toward the inner thread groove. The number of the rolling grooves is the number of the outer grooves minus 1. The rolling grooves face toward the inner thread groove of the screw nut, and respectively connected to the second end of the front outer groove, the first end of each intermediate outer groove, and the second end of the rear outer groove. The rolling grooves and the outer grooves are linked to form an outer thread groove. The outer thread groove and the inner thread groove define a spiral channel therebetween. The reflow component further comprises of a second reflow groove located in an opposing inner surface thereof. The second reflow groove faces toward the first reflow groove of the screw shaft, thereby defining with the first reflow groove of the screw shaft a reflow channel therebetween. The reflow channel is connected to the spiral channel. The balls are rotatably accommodated in the reflow channel or spiral channel. Further, the number of the outer grooves can be 3. Alternatively, the number of the outer grooves can be larger than 3 to increase the overall length of the outer grooves for accommodating more amount of balls.

Thus, the tunnel raceway type ball screw assembly has the reflow component be mounted in the outer surface of the screw shaft so that the screw nut, the screw shaft and the reflow component define therein an enclosed raceway for cycling the balls. Thus, the tunnel raceway type ball screw assembly needs not any design to shift a pitch and can prevent the balls from hitting other components during cycling. Therefore, the invention greatly enhances structural durability, reliability and cycling stability.

Other advantages and features of the present invention will be fully understood by reference to the following specification in conjunction with the accompanying drawings, in which like reference signs denote like components of structure.

BRIEF DESCRIPTION OF THE DRAWINGS

FIG. 3 is a top view of the screw shaft of the first embodiment of the present invention.

FIG. 4 is an oblique top elevational view of the reflow component of the first embodiment of the present invention.

FIG. 5 corresponds to FIG. 4 when viewed from another angle.

DETAILED DESCRIPTION OF THE INVENTION

Figure 1:
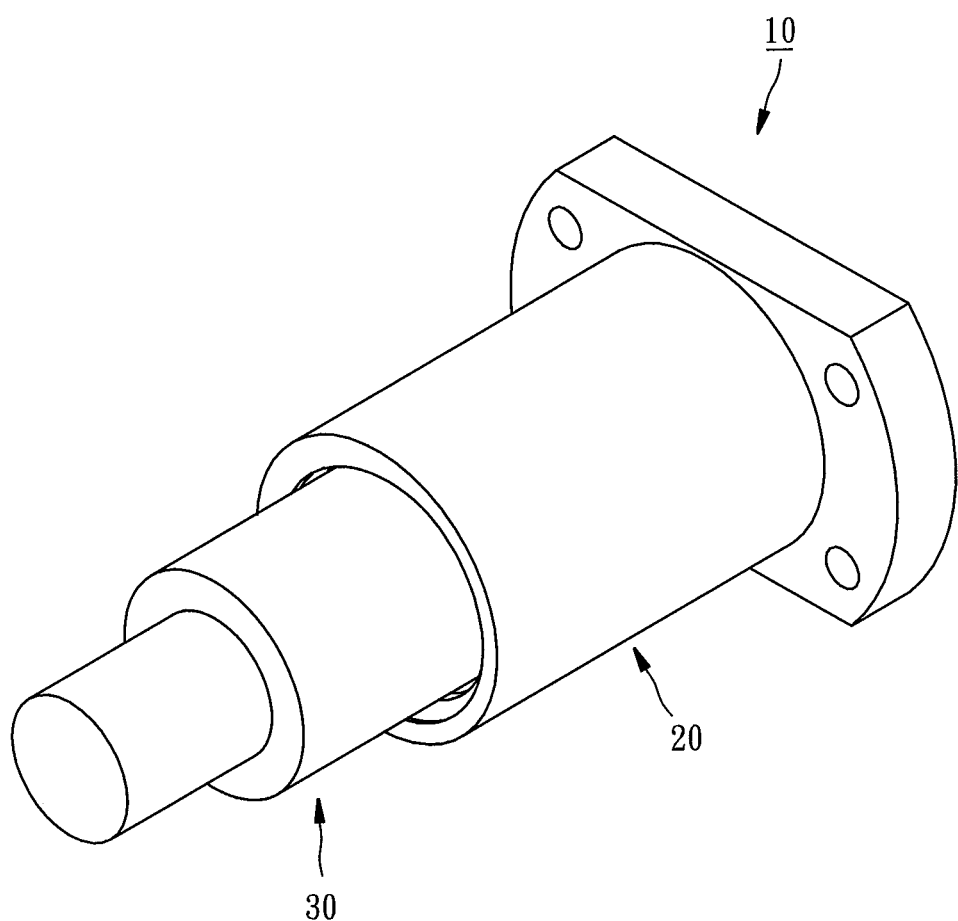
FIG. 1 is an oblique top elevational view of a tunnel raceway type ball screw assembly in accordance with a first embodiment of the present invention.
Figure 2:
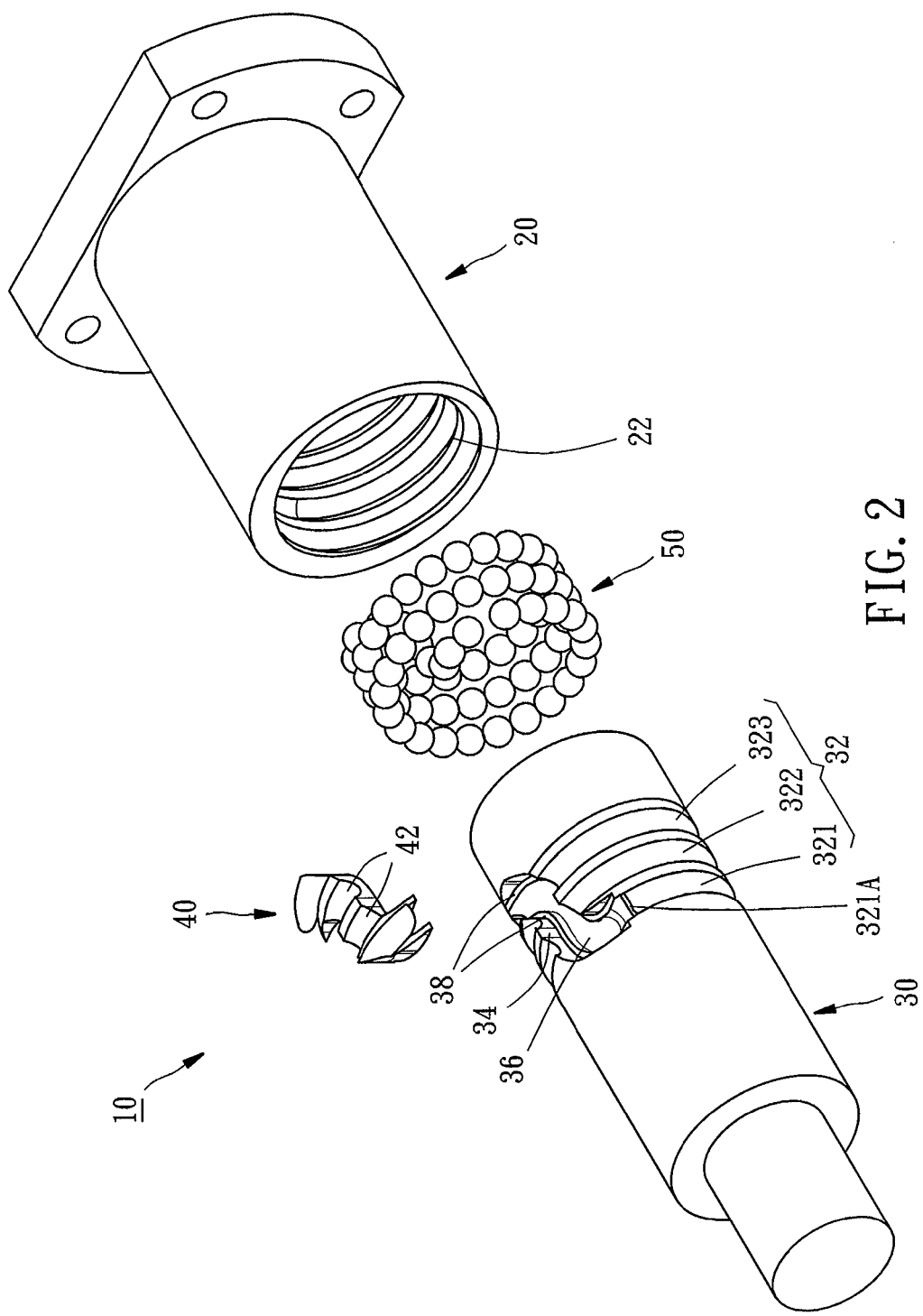
FIG. 2 is an exploded view of the tunnel raceway type ball screw assembly in accordance with the first embodiment of the present invention.
Figure 6:
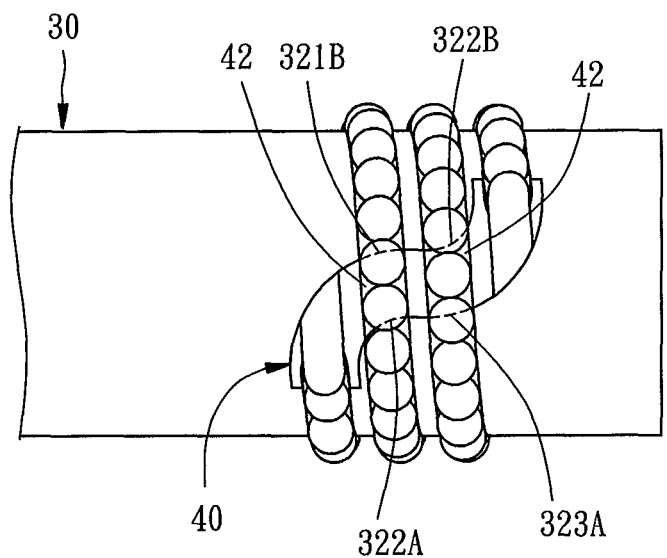
FIG. 6 is a schematic assembly view of the screw shaft, reflow component and balls of the first embodiment of the present invention.
Figure 7:
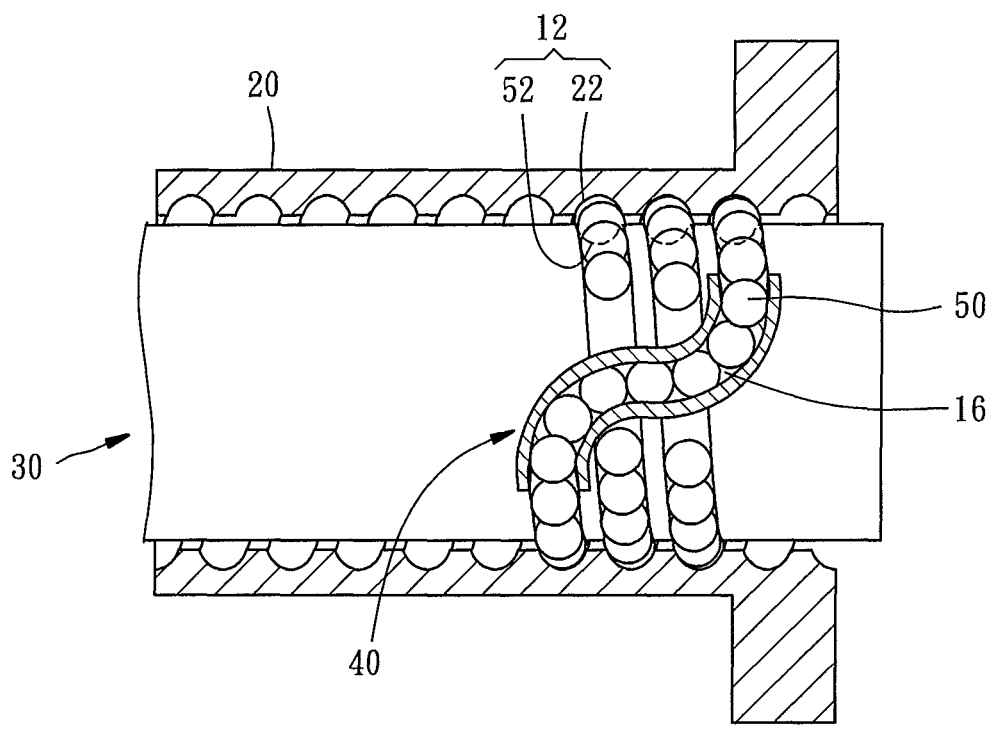
FIG. 7 is a longitudinal sectional view of the first embodiment of the present invention, illustrating the arrangement of the reflow channel and the spiral channel.
Figure 8:
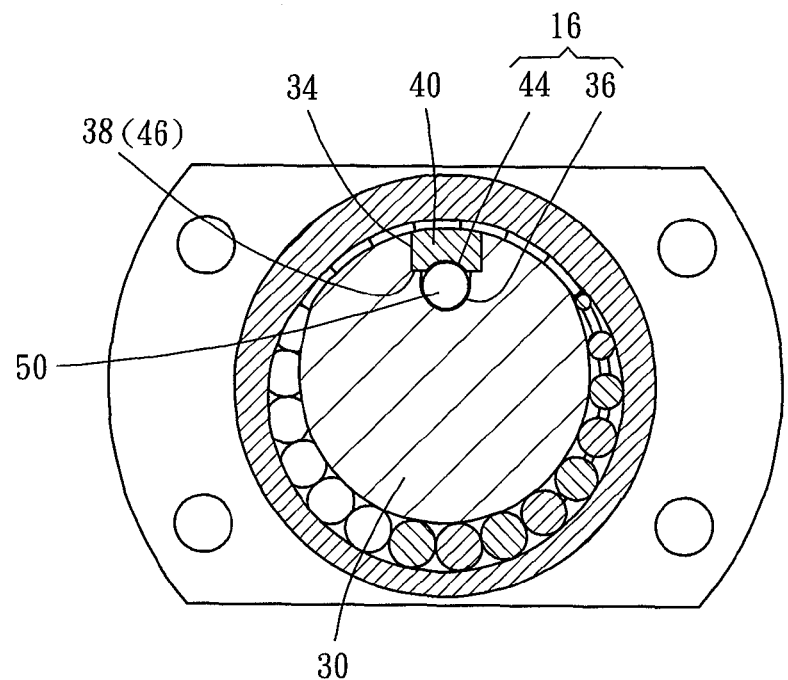
FIG. 8 is a transverse sectional view of the first embodiment of the present invention, illustrating the relationship between the first reflow groove of the screw shaft and the second reflow groove of the reflow component.

Referring to FIGS. 1-8, a tunnel raceway type ball screw assembly 10 in accordance with a first embodiment of the present invention is shown. The ball screw assembly 10 comprises of a screw nut 20, a screw shaft 30, a reflow component 40, and a plurality of balls 50.

The screw nut 20 comprises of an inner thread groove 22.

The screw shaft 30 is rotatably inserted through the screw nut 20, comprising a plurality of, for example, three outer grooves 32 extending around the periphery thereof corresponding to the inner thread groove 22. As illustrated in FIGS. 2-6, these outer groove 32 are spaced along the axis of the screw shaft 30 and identified as a front outer groove 321 at the front side, a rear outer groove 323 at the rear side, and at least one, for example, one intermediate outer groove 322 on the middle between the front outer groove 321 and the rear outer groove 323. The screw shaft 30 further comprises of a mounting groove 34 extending across the outer grooves 32, and a first reflow groove 36 radially kept in communication with the mounting groove 34. The mounting groove 34 extends in the length direction of the screw shaft 30 in a curved manner and across multiple thread leads of the outer grooves 32. The cross section of the first reflow groove 36 exhibits a semi-circular shape. The first reflow groove 36 has a first end 321A connected to the front outer groove 321, and an opposing second end 323B connected to the rear outer groove 323. Further, the first reflow groove 36 defines two first bearing surfaces 38 at two opposite lateral sides thereof. It is to be noted that the mounting groove 34 substantially extends along the first reflow groove 36, and is kept in communication with the second end 321B of the front outer groove 321, two opposite ends 322A and 322B of the intermediate outer groove 322 and the first end 323A of the rear outer groove 323.

Referring to FIGS. 2-8 again, the reflow component 40 comprise s of a plurality of rolling grooves 42 located in an outer surface thereof corresponding to the inner thread groove 22. The number of the rolling grooves 42 is the number of intermediate outer groove 322 plus 1 (i.e., the total number of the outer grooves minus 1). These rolling grooves 42 are respectively linked to the second end 321B of the front outer groove 321, the first end 322A of the intermediate outer groove 322, the second end 322B of the intermediate outer groove 322 and the second end 323B of the rear outer groove 323. The rolling grooves 42 and the outer grooves 32 are connected to form an outer thread groove 52. The outer thread groove 52 and the inner thread groove 22 of the screw nut 20 define therebetween a closed spiral channel 12.

It is to be noted that the reflow component 40 further comprises of a second reflow groove 44 located in an opposing inner surface thereof. The cross section of the second reflow groove 44 exhibits a semi-circular shape. The second reflow groove 44 defines two second bearing surfaces 46 at two opposite lateral sides thereof. In installation, the reflow component 40 is mounted in the mounting groove 34 of the screw shaft 30 to let the second bearing surface 46 of the reflow component 40 be abutted against the first bearing surface 38 of the screw shaft 30. After installation, the second reflow groove 44 of the reflow component 40 faces toward the first reflow groove 36 of the screw shaft 30, thereby defining with the first reflow groove 36 of the screw shaft 30 a reflow channel 16 therebetween that is connected to the spiral channel 12.

The balls 50 are accommodated in the spiral channel 12 or the reflow channel 16, and can be cycled in therein during rotation of the screw shaft 30. In the first embodiment of the present invention in FIGS. 1-8, the number of the outer grooves is 3.

Figure 9:
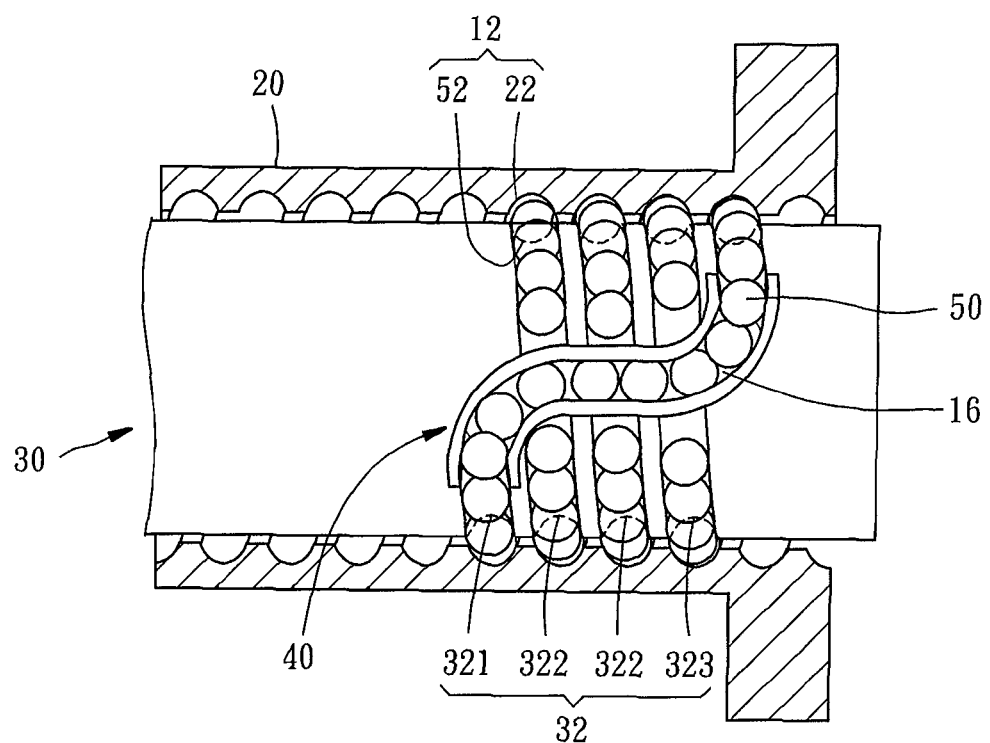
FIG. 9 is a longitudinal sectional view of a tunnel raceway type ball screw assembly in accordance with a second embodiment of the present invention.

Referring to FIG. 9, a tunnel raceway type ball screw assembly in accordance with a second embodiment of the present invention is shown. According to this second embodiment, the number of the outer grooves is larger than 3. As illustrated, the number of the outer grooves in this second embodiment is 4, including a front outer groove 321, a rear outer groove 323 and two intermediate outer grooves 322. Thus, the overall length of the outer grooves 52 is increased for accommodating more amount of balls 50 to bear a relatively larger load.

It can be known from the above structure that the tunnel raceway type ball screw assembly 10 has the reflow component 40 located in the outer surface of the screw shaft 30 to form with the screw shaft 30 a tunnel-like reflow channel 16 that matches with a spiral channel 12 between the screw nut 20 and the screw shaft 30 for accommodating the balls 50 for cycling. When compared with prior art designs, the tunnel raceway type ball screw assembly 10 needs not any design to shift a pitch, thereby shortening the outer diameter of the screw nut 20 and preventing the balls 50 from hitting other components during cycling, and thus, the invention greatly enhances structural durability, reliability and cycling stability.

What is claimed is:

1. A ball screw assembly, comprising:
a screw nut comprising an inner thread groove;
a screw shaft rotatably inserted through the screw nut, said screw shaft comprising a plurality of outer grooves corresponding to said inner thread groove, a first reflow groove and a mounting groove, each said outer groove comprising opposing first end and second end, said outer grooves being arranged along the length of said screw shaft and identified as a front outer groove at a front side, a rear outer groove at an opposing rear side and at least one intermediate outer groove between said front outer groove and said rear outer groove, said first reflow groove comprising a first end connected to said front outer groove and an opposing second end connected to said rear outer groove, said mounting groove substantially extending along said first reflow groove in communication with the second end of said front outer groove and the first end of said rear outer groove and opposing first and second ends of each said intermediate outer groove;
a reflow component mounted in said mounting groove of said screw shaft, said reflow component comprising a plurality of rolling grooves located in an outer surface thereof, the number of said rolling grooves being the number of said outer groove minus 1, said rolling grooves corresponding to said inner thread groove of said screw nut and respectively connected to the second end of said front outer groove, the first end of each said intermediate outer groove and the second end of said rear outer groove, said rolling grooves and said outer groove being linked to form an outer thread groove, said outer thread groove and said inner thread groove defining a spiral channel therebetween, said reflow component further comprising a second reflow groove located in an opposing inner surface thereof, said second reflow groove facing toward said first reflow groove of said screw shaft and defining with said first reflow groove of said screw shaft a reflow channel therebetween, said reflow channel being connected to said spiral channel; and
a plurality of balls rotatably accommodated in one of said reflow channel and said spiral channel.

2. The ball screw assembly as claimed in claim 1, wherein said mounting groove of said screw shaft extends along the length of said screw shaft in a curved manner across at least two thread pitches of said outer grooves.

3. The ball screw assembly as claimed in claim 1, wherein said first reflow groove of said screw shaft defines two first bearing surfaces at two opposite lateral sides thereof; said second reflow groove of said reflow component defines two second bearing surfaces at two opposite lateral sides thereof and respectively abutted against said first bearing surfaces.

4. The ball screw assembly as claimed in claim 1, wherein said first reflow groove of said screw shaft has a semi-circular cross section; said second reflow groove of said reflow component has a semi-circular cross section.

5. The ball screw assembly as claimed in claim 1, wherein the number of said outer grooves is 3.

6. The ball screw assembly as claimed in claim 1, wherein the number of said outer grooves is larger than 3 to increase the length of said outer grooves for accommodating relatively larger number of said balls.

* * * * *